United States Patent
Wu

(10) Patent No.: US 9,899,679 B2
(45) Date of Patent: Feb. 20, 2018

(54) CATHODE FOR SEAWATER BATTERY AND METHOD FOR MAKING THE SAME

(71) Applicant: Xiamen Lonako Industry & Trade Co., Ltd., Xiamen (CN)

(72) Inventor: Ting Lun Wu, Xiamen (CN)

(73) Assignee: XIAMEN LONAKO INDUSTRY & TRADE CO., LTD., Xiamen, Fujian (CN)

( * ) Notice: Subject to any disclaimer, the term of this patent is extended or adjusted under 35 U.S.C. 154(b) by 29 days.

(21) Appl. No.: 15/166,209

(22) Filed: May 26, 2016

(65) Prior Publication Data

US 2017/0141398 A1 May 18, 2017

(30) Foreign Application Priority Data

Nov. 13, 2015 (CN) .......................... 2015 1 0775832

(51) Int. Cl.
| | | |
|---|---|---|
| *H01M 4/00* | (2006.01) | |
| *H01M 4/58* | (2010.01) | |
| *H01M 4/04* | (2006.01) | |
| *H01M 4/08* | (2006.01) | |
| *H01M 4/62* | (2006.01) | |
| *H01M 4/66* | (2006.01) | |
| *H01M 6/34* | (2006.01) | |
| *H01M 4/06* | (2006.01) | |
| *H01M 4/36* | (2006.01) | |
| *H01M 4/02* | (2006.01) | |

(52) U.S. Cl.
CPC ......... *H01M 4/5825* (2013.01); *H01M 4/043* (2013.01); *H01M 4/0433* (2013.01); *H01M 4/0471* (2013.01); *H01M 4/06* (2013.01); *H01M 4/08* (2013.01); *H01M 4/364* (2013.01); *H01M 4/622* (2013.01); *H01M 4/625* (2013.01); *H01M 4/661* (2013.01); *H01M 6/34* (2013.01); *H01M 2004/028* (2013.01)

(58) Field of Classification Search
CPC ........ H01M 4/06; H01M 4/364; H01M 4/043; H01M 6/34; H01M 4/661; H01M 4/622; H01M 2004/028; H01M 4/08; H01M 4/0433; H01M 4/625; H01M 4/5825; H01M 4/0471

See application file for complete search history.

(56) References Cited

U.S. PATENT DOCUMENTS

| | | | |
|---|---|---|---|
| 6,271,474 B1 * | 8/2001 | Fujikami | ............... H01L 39/248 174/125.1 |
| 2012/0115030 A1 * | 5/2012 | Tanaka | ............... H01G 11/28 429/211 |

* cited by examiner

*Primary Examiner* — Mark F. Huff
*Assistant Examiner* — Monique M Wills
(74) *Attorney, Agent, or Firm* — Leong C. Lei

(57) ABSTRACT

A cathode for a seawater battery and a method for making the cathode are disclosed. The cathode is made using a mixture of copper sulfate monohydrate and anhydrous copper sulfate at a mass percentage of 70-92%, conductive carbon powder at a mass percentage of 1-10%, conductive carbon fiber at a mass percentage of 1-10%, polyethylene PE powder at a mass percentage of 3-15%, and polyethylene wax at a mass percentage of 3-12%; and using metal titanium sheet or nickel sheet as a current collecting electrode. The cathode prevents the battery from the problems of slow activation when meeting water and of inferior output in fresh water.

10 Claims, No Drawings

CATHODE FOR SEAWATER BATTERY AND METHOD FOR MAKING THE SAME

BACKGROUND OF THE INVENTION

1. Technical Field

The present invention relates to seawater batteries and more particularly to a cathode for a seawater battery and a method for making the cathode.

2. Description of Related Art

Presently, cathodes in seawater batteries are usually made through using insoluble compounds such as cuprous chloride (CuCl), cuprous iodide (CuI), and silver chloride (AgCl) as the active substance, using graphite or the like as the conductive matter, and performing processes including hot melting, binding with a binding agent, casting, and molding on a conductive metal pole, while anodes are mainly made of magnesium alloy.

The batteries using the conventional cathodes as described above however have some disadvantages. As the compounds used as the active substance of the cathode are all insoluble to water, the batteries have slow activation when meeting water. The batteries' performance in fresh water is not as good as in seawater. Besides, the mold-forming process is relatively inefficient. Also, storage of such batteries is difficult under normal conditions and requires drying, sealing and full isolation from moisture.

SUMMARY OF THE INVENTION

One objective of the present invention is to provide a cathode for a seawater battery so that the battery is free from the problems related to slow activation when meeting water and to inferior output in fresh water as seen in the existing seawater batteries.

Another objective of the present invention is to provide a method for making such a cathode, which contributes to good productivity and stability of batch production of seawater batteries, and the resultant seawater batteries can be stored under normal conditions without contact with water, thereby eliminating the needs for drying and sealing.

For achieving the foregoing objectives, the present invention implements the following solutions:

A cathode for a seawater battery is made using a mixture of copper sulfate monohydrate and anhydrous copper sulfate as an active matter, at a mass percentage of 70-92%; using conductive carbon powder and conductive carbon fiber as a conductive matter, wherein the conductive carbon powder has a mass percentage of 1-10% and the conductive carbon fiber has a mass percentage of 1-10%; using polyethylene powder and polyethylene wax as a binding agent, wherein the PE powder has a mass percentage of 3-15% and the PE wax has a mass percentage of 3-12%; and using metal titanium sheet or nickel sheet as a current collecting electrode.

Further, the mixture of copper sulfate monohydrate ($CuSO_4.H_2O$) and anhydrous copper sulfate ($CuSO_4$) is made by heating copper sulfate pentahydrate ($CuSO_4.5H_2O$) for at least 3 hours at 150° C. to 250° C.

Further, the conductive carbon powder has a size greater than 300 mesh.

Further, conductive carbon fiber has a length-diameter ratio greater than 20.

Further, the polyethylene powder (PE powder) has a size greater than 30 mesh.

Further, polyethylene wax (PE wax) has a size greater than 30 mesh powder.

Further, the metal titanium sheet or nickel sheet has thickness smaller than 0.5 mm, and has a width ratio with respect to the cathode of 0.1:1-0.95:1.

A method for making a cathode for a seawater battery comprises the following steps:

(1) heating copper sulfate pentahydrate for at least 3 hour at 150° C. to 250° C. so as to produce a mixture of copper sulfate monohydrate and anhydrous copper sulfate; and (2) mixing the mixture of copper sulfate monohydrate and anhydrous copper sulfate at a mass percentage of 70-92% with conductive carbon powder at a mass percentage of 1-10%, conductive carbon fiber at a mass percentage of 1-10%, polyethylene PE powder at a mass percentage of 3-15%, and polyethylene wax at a mass percentage of 3-12% to homogeneity, and making the homogeneous material into beads through heating, pressurizing and cutting; placing metal titanium or nickel electrode sheet at a center of a cavity of a mold; injecting the cathode beads into the mold having the titanium or nickel electrode sheet therein using an injection screw, and cooling and demolding to obtain the cathode.

In the aforementioned schemes of the present invention, copper sulfate is strong electrolyte and highly soluble to water. When dissolved in fresh water or purified water, it not only helps to improve the electrolytic performance of the battery, but also chemically reacts well with metal magnesium in the anode to generate electricity effectively. That is the reason the present invention use copper sulfate as the active substance of the cathode. However, copper sulfate normally exists as copper sulfate pentahydrate that is in the form of blue, sand-like crystals, which are less processable and less possible to be mixed well with the conductive matter and conductor and the binding agent. For addressing this problem, the present invention has the step of heating copper sulfate pentahydrate for at least 3 hours at 150° C. to 250° C. to produce a powdery mixture of copper sulfate monohydrate and anhydrous copper sulfate. Copper sulfate monohydrate and anhydrous copper sulfate can be stored under normal conditions without special protection. Even when coexisting with high moisture, they can only generate copper sulfate pentahydrate. According to the present invention, copper sulfate, copper sulfate monohydrate and copper sulfate pentahydrate are all active substances for the cathode.

Conductive carbon powder and carbon fiber are both used as the conductive matter. By mixing the two in a specific proportion, not only can the conductivity of the cathode block be enhanced, the strength and physical properties of the cathode block can be improved. Therein, conductive carbon powder can be well mixed with the active substance and the binding agent so as to ensure good conductivity of the cathode block. Carbon fiber is added for conducting electricity and for forming network structure, thereby improving the strength of the cathode block and increasing gaps. Since cathode blocks for seawater batteries are processed and formed under high heat and high pressure, they are unavoidably overhardened. When the battery meet water for reaction, the overhardened cathode block can slow down the release of the active substances and even lead to internal clog that interrupts the reaction. With carbon fiber added, the reactant remains having small gaps even under high heat and high pressure, thereby ensuring full reaction of the active substance of the cathode.

By adding polyethylene resin into polyethylene wax as the binding agent, the flowability of materials during process of the cathode block can be improved, and the forming pressure can be reduced.

Metal titanium sheet and nickel sheet used as electrodes are both highly resistant to corrosion and oxidization, and titanium sheet is particularly preferred. By making the electrode into sheet, the contacting area with the cathode block is increased, thereby providing better current collecting effect as compared to a columnar electrode.

DETAILED DESCRIPTION OF THE INVENTION

Some specific embodiments will be described below for illustrating the present invention in detail.

A cathode for a seawater battery is made using a mixture of copper sulfate monohydrate (CuSO4.H2O) and anhydrous copper sulfate (CuSO4) as an active matter, with a mass percentage of 70-92%. The mixture of copper sulfate monohydrate (CuSO4.H2O) and anhydrous copper sulfate (CuSO4) is made by heating copper sulfate pentahydrate ($CuSO_4.5H_2O$) for more than 3 hours at 150° C. to 250° C.

Conductive carbon powder and conductive carbon fiber are used as conductive matters, each at a mass percentage of 1-10%. The conductive carbon powder has a size greater than 300 mesh. The conductive carbon fiber has a length-diameter ratio greater than 20.

Polyethylene powder and polyethylene wax are used as a binding agent, have a mass percentage of 3-15% and of 3-12%, respectively. Both of the polyethylene powder (PE powder) and the polyethylene wax (PE wax) have a size greater than 30 mesh.

Metal titanium sheet or nickel sheet is used as a current collecting electrode. The metal titanium or nickel sheet has a thickness smaller than 0.5 mm, and has a width ratio with respect to the cathode of 0.1-0.95:1. The metal titanium or nickel sheet acting as the current collecting electrode has a mass in the cathode small enough to be neglected.

A method for making a cathode for a seawater battery comprises the following steps:
(1) heating copper sulfate pentahydrate ($CuSO_4.5H_2O$) for at least 3 hour at 150° C. to 250° C. so as to produce a mixture of copper sulfate monohydrate (CuSO4.H2O) and anhydrous copper sulfate (CuSO4);
(2) mixing the mixture of copper sulfate monohydrate (CuSO4.H2O) and anhydrous copper sulfate (CuSO4) at a mass percentage of 70-92% with conductive carbon powder at a mass percentage of 1-10%, conductive carbon fiber at a mass percentage of 1-10%, polyethylene PE powder at a mass percentage of 3-15%, and polyethylene wax at a mass percentage of 3-12% to homogeneity, and making the homogeneous material into beads through heating, pressurizing and cutting; placing metal titanium or nickel electrode sheet at a center of a cavity of a mold; injecting the cathode beads into the mold having the titanium or nickel electrode sheet therein using an injection screw, and cooling and demolding to obtain the cathode.

The present invention features for the use of the water-soluble compound, copper sulfate. As compared to the conventional seawater batteries, the battery using the disclosed cathode performs much better in fresh water and purified water. It has been proven in tests that the seawater battery of the present invention has a discharge difference between in seawater, in fresh water and in purified water smaller than 30%.

The present invention uses plastic injection so as to significantly improve production efficiency and consistency as compared to the traditional process that involves hot melting, casting and molding.

By using both carbon powder and carbon fiber as the conductive matter, the present invention leads to improved conductivity and enhanced physical strength of the battery. Besides, the network structure of the carbon fiber helps to preventing the cathode block from overhardened.

Unlike the conventional batteries that need drying and sealing for storage, the disclosed seawater battery only requires prevention from contacting water before use.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A cathode for a seawater battery comprising: a mixture of copper sulfate monohydrate and anhydrous copper sulfate as an active matter, which has a mass percentage of 70-92%; using conductive carbon powder and conductive carbon fiber as a conductive matter, where in the conductive carbon powder has a mass percentage of 1-10% and the conductive carbon fiber has a mass percentage of 1-10%; using polyethylene powder and polyethylene wax as a binding agent, wherein the polyethylene PE powder has a mass percentage of 3-15% and the polyethylene wax has a mass percentage of 3-12%; and using metal titanium sheet or nickel sheet as a current collecting electrode.

2. The cathode of claim 1, wherein the mixture of copper sulfate monohydrate and anhydrous copper sulfate is made by heating copper sulfate pentahydrate for at least 3 hours at 150° C. to 250° C.

3. The cathode of claim 1, wherein the conductive carbon powder has a size greater than a particle size of 300 mesh.

4. The cathode of claim 1, wherein the conductive carbon fiber has a length-diameter ratio greater than 20.

5. The cathode of claim 1, wherein the polyethylene powder has a size greater than a particle size of 30 mesh.

6. The cathode of claim 1, wherein the polyethylene wax has a size greater than a particle size of 30 mesh.

7. The cathode of claim 1, wherein the metal titanium sheet or nickel sheet has a thickness smaller than 0.5 mm, and has a width ratio with respect to the cathode of 0.1:1-0.95:1.

8. A method for making a cathode for a seawater battery, comprising the following steps:
(1) heating copper sulfate pentahydrate for at least 3 hour at 150° C. to 250° C. so as to produce a mixture of copper sulfate monohydrate and anhydrous copper sulfate; and
(2) mixing the mixture of copper sulfate monohydrate and anhydrous copper sulfate at a mass percentage of 70-92% with conductive carbon powder at a mass percentage of 1-10%, conductive carbon fiber at a mass percentage of 1-10%, polyethylene PE powder at a mass percentage of 3-15%, and polyethylene wax at a mass percentage of 3-12% to homogeneity, and making the homogeneous material into beads through heating, pressurizing and cutting; placing metal titanium or nickel electrode sheet at a center of a cavity of a mold; injecting the cathode beads into the mold having the titanium or nickel electrode sheet therein using an injection screw, and cooling and demolding to obtain the cathode.

9. The method of claim 8, wherein the conductive carbon powder has a size greater than a particle size of 300 mesh; the conductive carbon fiber has a length-diameter ratio greater than 20; the polyethylene powder has a size greater than a particle size of 30 mesh; and the polyethylene wax has a size greater than a particle size of 30 mesh.

10. The method of claim 8, wherein the metal titanium sheet or the nickel sheet has thickness smaller than 0.5 mm, and has a width ratio with respect to the cathode of 0.1:1-0.95:1.

\* \* \* \* \*